United States Patent [19]

Gahang

[11] Patent Number: 5,442,459
[45] Date of Patent: Aug. 15, 1995

[54] PROCESS FOR ENCODING A HALF TONE IMAGE CONSIDERING SIMILARITY BETWEEN BLOCKS

[75] Inventor: Goo-Soo Gahang, Seoul, Rep. of Korea

[73] Assignee: SamSung Electronics Co., Ltd., Suwon, Rep. of Korea

[21] Appl. No.: 163,875

[22] Filed: Dec. 9, 1993

[30] Foreign Application Priority Data

Dec. 9, 1992 [KR] Rep. of Korea ............... 23720/1992

[51] Int. Cl.$^6$ ............................................. H04N 1/415
[52] U.S. Cl. ................................ 358/433; 358/432; 358/426
[58] Field of Search ............... 358/433, 432, 261.3, 358/426

[56] References Cited

U.S. PATENT DOCUMENTS

| | | | |
|---|---|---|---|
| 4,553,171 | 11/1985 | Holladay et al. | 358/433 |
| 4,577,235 | 3/1986 | Kannapell et al. | 382/52 |
| 4,667,251 | 5/1987 | Hasegawa | 358/426 |
| 4,703,352 | 10/1987 | Kondo | 358/433 |
| 4,791,586 | 12/1988 | Maeda et al. | 364/491 |
| 4,831,659 | 5/1989 | Miyaoka et al. | 382/56 |
| 4,853,970 | 8/1989 | Ott et al. | 382/54 |
| 4,945,502 | 7/1990 | Kwon et al. | 364/574 |
| 5,109,437 | 4/1992 | Honda | 358/433 |
| 5,148,292 | 9/1992 | Kutaragi | 358/433 |
| 5,151,787 | 9/1992 | Park | 358/162 |
| 5,212,740 | 5/1993 | Paek et al. | 382/22 |
| 5,243,446 | 9/1993 | Pollich et al. | 358/433 |
| 5,247,589 | 9/1993 | Faul et al. | 358/433 |
| 5,345,317 | 9/1994 | Katsuno et al. | 358/433 |

*Primary Examiner*—Scott A. Rogers
*Assistant Examiner*—Thomas L. Stoll
*Attorney, Agent, or Firm*—Robert E. Bushnell

[57] ABSTRACT

A device and process for encoding a gradation image of an image transmission system. In order to reduce the amount of transmission data while preserving an edge component sensitive to a human's visual characteristic in a half tone image considering similarity between blocks, a block to be encoded is checked to see if it is an edge block, a block similar to an adjacent block or a flat block. By the checked result, the block is encoded to first to fourth encoding formats.

14 Claims, 6 Drawing Sheets

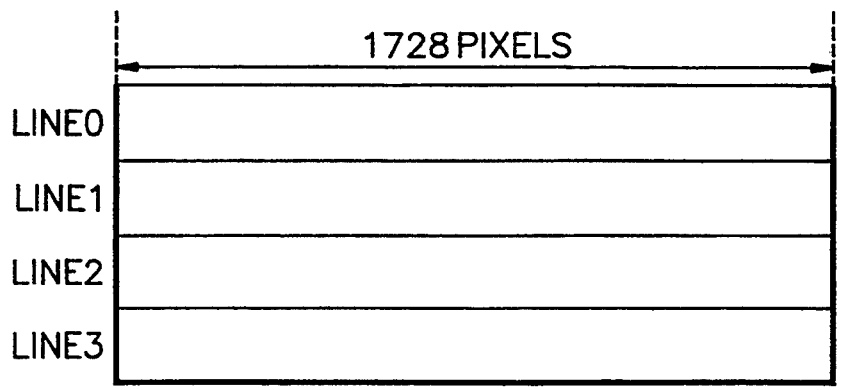
FIG. 3A
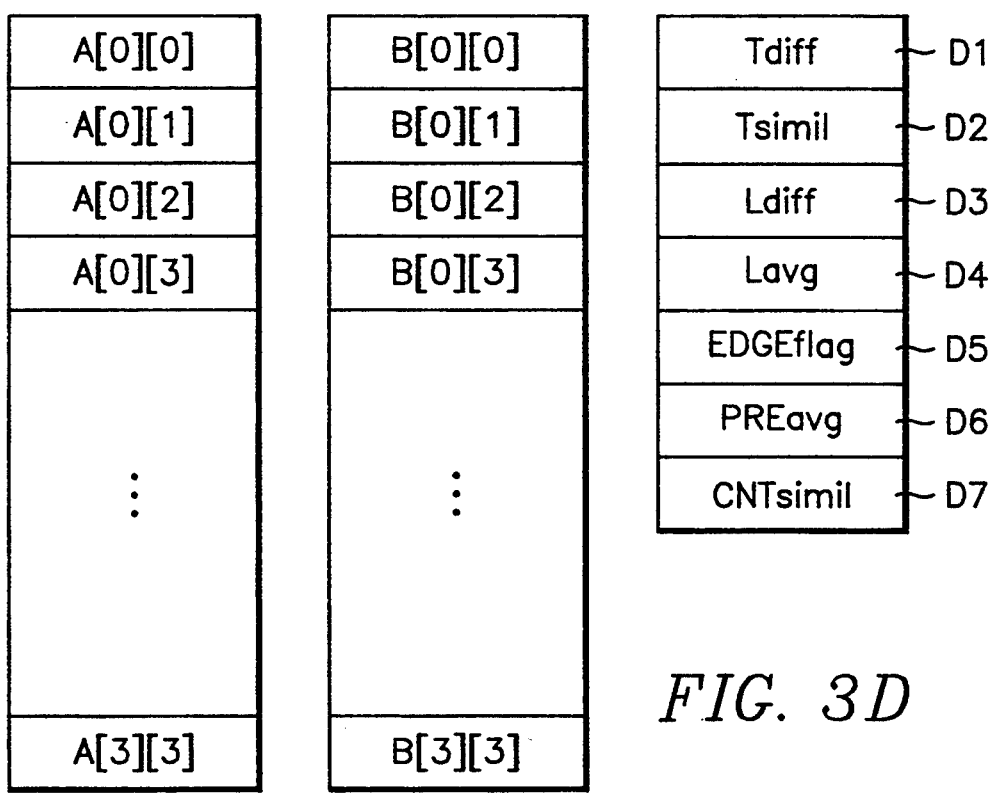
FIG. 3B  FIG. 3C
FIG. 3D

```
sign(+)      :  0
sign(-)      :  1
    1        :  0
    2        :  10
    3        :  110
    4        :  1110
    5        :  11110
    6        :  111110
    7        :  1111110
    8        :  11111110
    9        :  111111110
   10        :  1111111110
   11        :  11111111110
   12        :  111111111110
   13        :  1111111111110
   14        :  11111111111110
   15        :  111111111111110
```

PROCESS FOR ENCODING A HALF TONE IMAGE CONSIDERING SIMILARITY BETWEEN BLOCKS

CROSS REFERENCE TO RELATED APPLICATIONS

This application makes reference to and claims all benefits arising under 35 U.S.C. §119 arising from the earlier filing of an application in the Ministry of Industry and Trade of the Republic of Korea on Dec. 9, 1992 duly assigned Ser. No. 23720/1992.

BACKGROUND OF THE INVENTION

The present invention relates to an apparatus and a process for encoding a gradation image in an image transmission system, and more particularly to a technique for reducing the amount of transmission data needed to represent the gradation image by encoding the transmission data, while preserving an edge component sensitive to human visual characteristics in a half tone image by considering the similarity between successive blocks of pixel data. Methods and apparatus for edge detection and correction are disclosed in the Peak et al., *Edge Detection Method and Apparatus for an Image Processing System*, (U.S. Pat. No. 5,212,740) and Park, *Method and Circuit for Correcting Image Edge*, (U.S. Pat. No. 5,151,787).

In image processing systems such as facsimiles, image scanners, printers, copiers, and the like, the expression of a half tone image is obtained from gradation image data from documents having gradations such as a picture, painting, etc. through the use of a dither matrix. The half tone image is classified into a real half tone and a dummy half tone, which differ in process of expression. Since the present invention deals with the dummy half tone, the expression process relating to the dummy half tone will be explained and no further description of the real half tone will be given. There are many processes of expressing the dummy half tone, including the ordered dither, random dither, error distribution, mean error least, mean difference limit, density pattern, and other processes. The ordered dither process is the simplest image expression process. The ordered dither process uses unvarying threshold locations in a matrix matched to entire images and determines a binarized threshold value from location information of each pixel. The ordered dither process is further divided into a dot concentration type such as spiral, scroll, etc. and a dot distribution type of a high spatial frequency such as bayer, dot, etc. One method for obtaining the half tone image expression from a gradation image quantized to a uniform gradation using the dither matrix is disclosed in the *Method For Extracting Halftone Image* Korea patent application No. 1990/16884, assigned to the instant assignee.

The half tone image expression using a dither matrix, however, is less than desirable because edges become smooth as a result of large brightness variation. That is, the human visual characteristic sensitive to edges is not considered, thus picture quality deteriorates. On the other hand, in transmitting the half tone image obtained by the dithering process using a dither matrix, encoding is needed. The encoding suitable for the half tone image however, has not been standardized in CCITT. Thus, in the encoding for transmitting the half tone image, a Modified Huffman or Modified READ encoding system of CCITT recommendation T.4 or Modified READ encoding system of T.6 has been used, as in the case of simple binarization data for documents of only characters. The Modified Huffman or Modified READ encoding system is suitable for a statistic characteristic obtained from the simple binarized image from one to eight of a CCITT test chart. Typically, since the Modified Huffman or Modified READ encoding system has similar or more data, transmission time increases.

Various encoding processes exist. I have observed that none however, effectively reduce the amount of transmission data needed for the reproduction of a gradation image while adequately preserving the edge component in the gradation image.

Pollich et al., Adaptive Clumped Dithering with Clump Plane Separation, (U.S. Pat. No. 5,243,446), mentions a process for data compression and image enhancement in a digital facsimile document transmission system. According to Pollich '446, low distinction blocks, containing low contrast information, are distinguished from high distinction blocks, containing high contrast information such as text or line drawing information. The low distinction blocks are encoded through clump plane separation techniques by clumping all of the pixels with corresponding threshold values together and encoding them. The high distinction blocks are not encoded, and are transmitted directly. The image is reproduced by re-integrating the clump planes to place the pixels of the low distinction block in their original positions. I have observed that this process does not effectively reduce the amount of transmission data needed to reproduce the image, because high distinction blocks, or edge portions, are not encoded and compressed, and are transmitted as is.

Miyaoka et al., *Method for Image Data Coding*, (U.S. Pat. No. 4,831,659), mentions a process for image data coding. According to Miyaoka '659, the global redundancy of an image is used. The image is divided into non-equal length blocks in accordance with changes in brightness. Portions exhibiting a gradual change in brightness are turned into large blocks and encoded. Portions exhibiting a sudden change in brightness are turned into small blocks and encoded. It has been my observation that this process does not effectively preserve detail in gradually changing portions of an image because the gradually changing portions are divided into large blocks and encoded. As a result, the gradually changing portions of an image are not preserved when the corresponding portions of the image are reproduced as a large block with continuous brightness.

Faul et al., *Method for Encoding Color Images*, (U.S. Pat. No. 5,247,589), discloses a process for encoding color images. According to the Faul '589, color image information is encoded by grouping adjacent pixels into blocks. Each block is compared with several templates to determine which template most closely approximates the block, and the block is encoded in accordance with the corresponding template. It seems to me however, that this template system results in loss of accuracy in transmitted data because the templates are only an approximation of each block of image data; thus, the transmitted data, which is made entirely of templates, is only an empirical approximation of the original image data.

SUMMARY OF THE INVENTION

Accordingly, it is an object of the present invention to provide an improved device for s and process of block encoding.

It is another object to provide a half-tone image encoding device and process enabling significant data compression while enabling reliable image reproduction.

It is another still object to provide a device and process for block encoding that can greatly reduce the amount of data needed to represent an image while preserving an edge component sensitive to human visual characteristics, in a half tone image encoding process of an image transmission system.

These and other objects may be achieved in accordance with the principles of the present invention. The present invention stores image data obtained by scanning a line of a document in units of pixels into a memory area corresponding to the scanned line, initializes a buffer memory for storing a binarized result for a pixel in a block, sets a previous block average value buffer for storing an average brightness value of a previous block, and resets an edge flag indicating that an edge occurs in the block. Thereafter, the present invention designates a window to process the image data stored in the memory area in units of a block, binarizes the image data in the designated window, and stores the binarized data in the buffer memory. Subsequently, the present invention calculates a brightness difference value indicating the difference between the maximum brightness value and the minimum brightness value in the buffer memory, and an average brightness value indicating average brightness of the pixels in the block. Then the present invention compares the brightness difference value with a predetermined reference brightness difference value, calculates the difference between the average brightness value and the average brightness value of the previous block if the brightness difference value is less than the reference brightness difference value, determines whether the previous block is an edge by a set state of the edge flag, and determines whether there is similarity between a current block and the previous block if the brightness difference value is greater than the reference brightness difference value. The current block is encoded in a first encoding format in order to raise data compression if there is similarity between the blocks, the current block is encoded in a second encoding format in order to preserve an edge part if there is no similarity between the blocks, the current block is encoded in a fourth encoding format if the previous block is an edge, and the current block is encoded in a third encoding format if the previous block is not an edge. If there is no similarity between the blocks, the current block is encoded in the first encoding format if the previous block is not an edge and there is similarity between the blocks. Other features and advantages of the invention will be set forth in, or apparent from, the following detailed description of the preferred embodiment of the invention.

BRIEF DESCRIPTION OF THE DRAWINGS

A more complete appreciation of this invention, and many of the attendant advantages s thereof, will be readily apparent as the same becomes better understood by reference to the following detailed description when considered in conjunction with the accompanying drawings in which like reference symbols indicate the same or similar components, wherein:

FIGS. 3A to 3D are diagrams illustrating memory structure configurations of one embodiment constructed according to the principles of the present invention;

DETAILED DESCRIPTION OF THE PREFERRED EMBODIMENT

In the following description, numerous specific details are set forth to provide a more thorough understanding of the present invention. It will be apparent, however, to one skilled in the art, that the present invention may be practiced without these specific details. In appropriate instances well known circuits have not been described in trivial detail so as to avoid obscuring the underlying considerations of the present invention.

Figure 1:
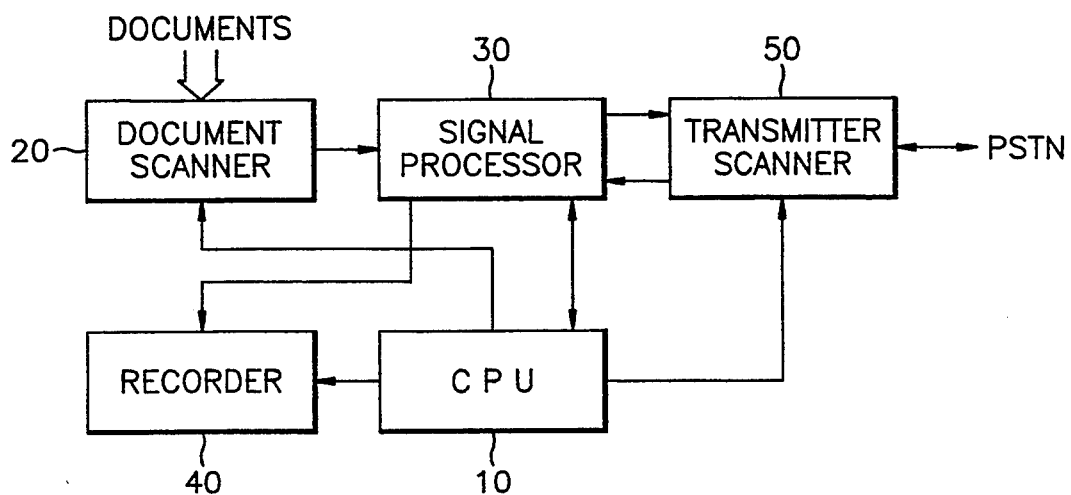
FIG. 1 is a block diagram of one embodiment of a facsimile system constructed according to the principles of the present invention.
Figure 2A:
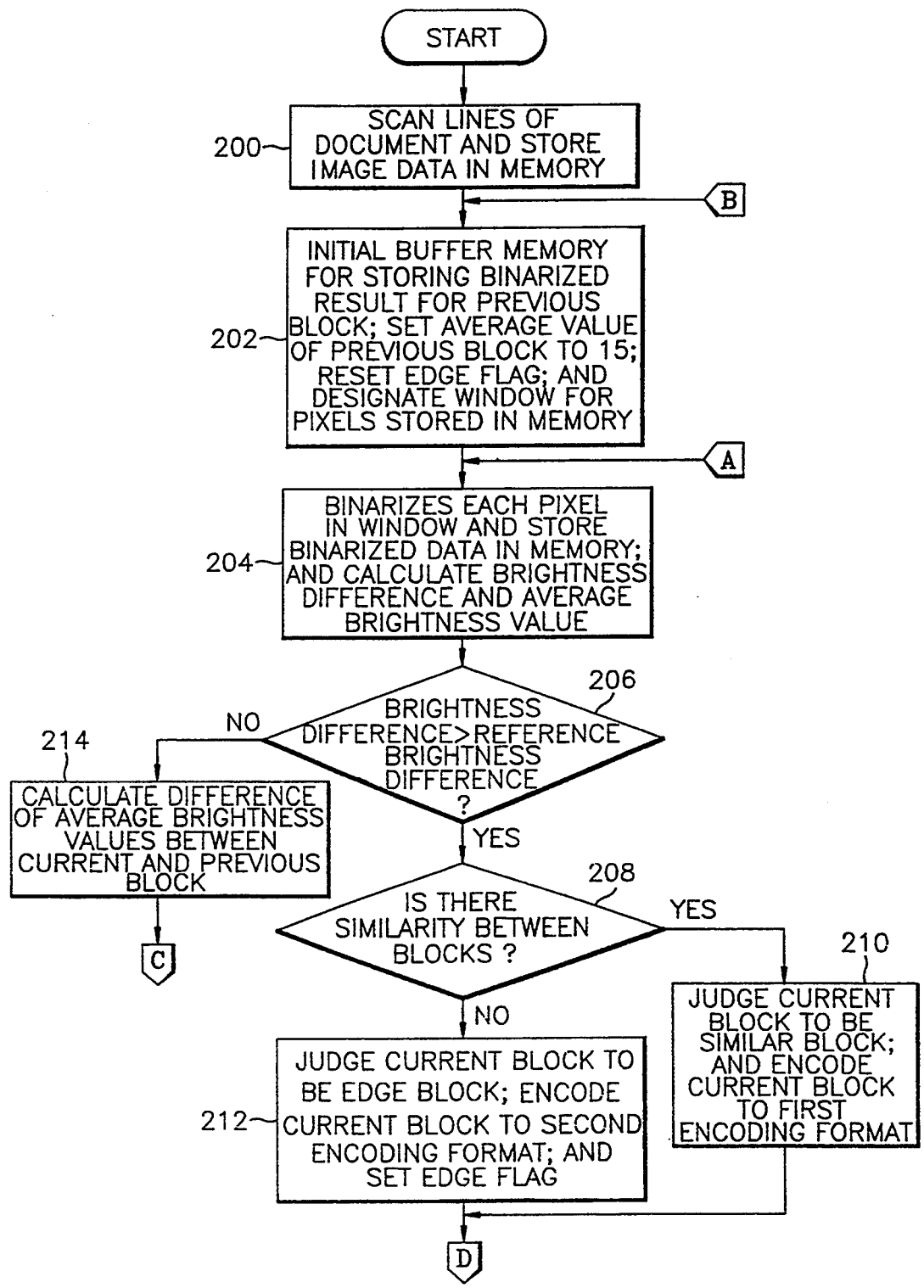
FIGS. 2A and 2B are flow charts showing performance of a control procedure according to the principles of the present invention.
Figure 2B:
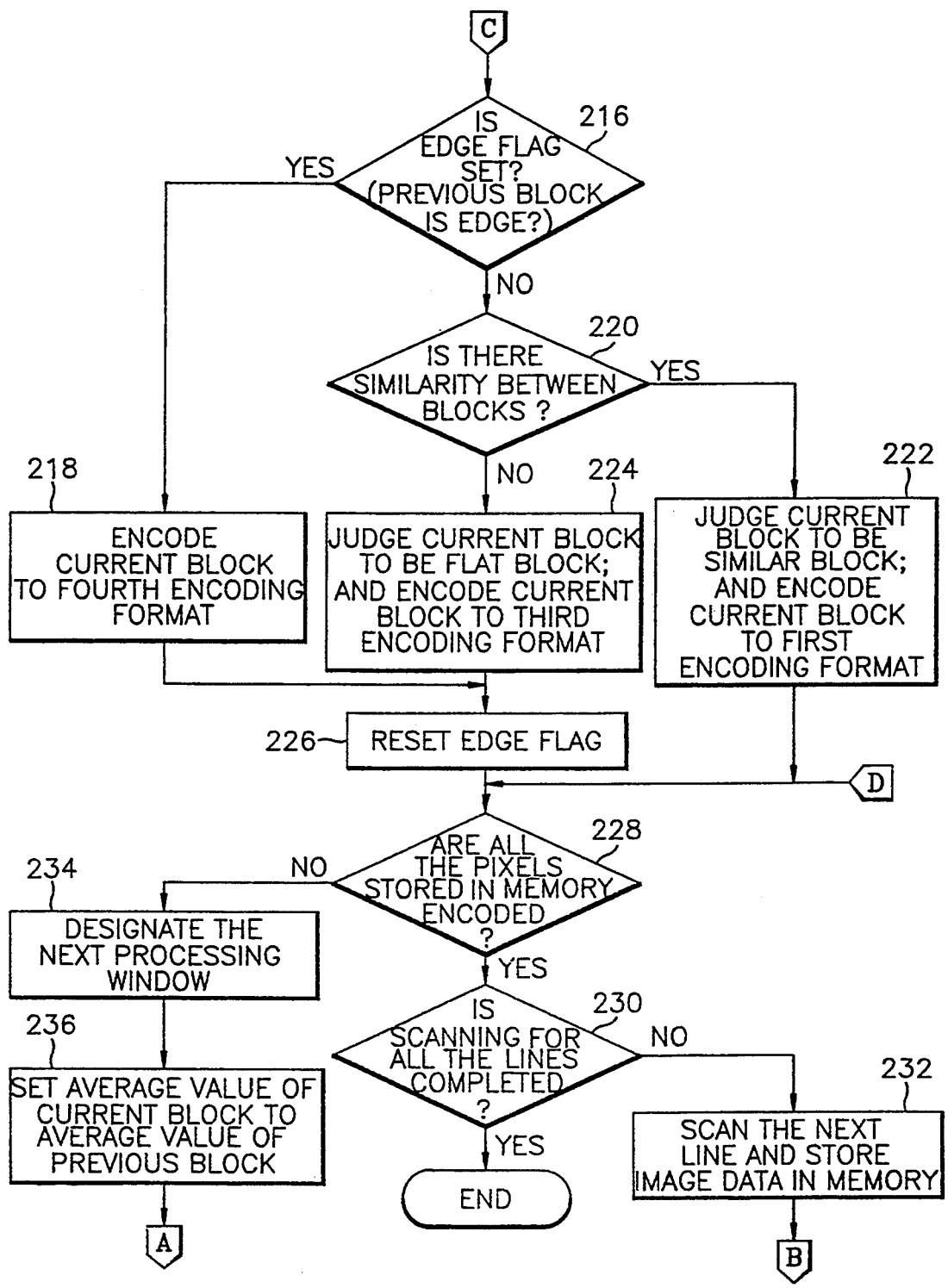

Turning now to the drawings, FIG. 1 illustrates a facsimile system constructed according to the principles of the present invention. A central processing unit (CPU) 10 controls the operation of the system by processing a program and executing various operations. A document scanner 20 scans documents under control of the central processing unit 10 and generates an analog image signal converted into digital image data therethrough. A signal processor 30 controlled by central processing unit 10 stores a dither matrix and the image data generated from document scanner 20 and implements encoding and decoding when transmitting and receiving image data with other systems. Recorder 40 receives the image data stored in signal processor 30 under control of central processing unit 10 and records the image data on recording paper. Controlled by central processing unit 10, transmitter 50 transmits the image data stored signal processor 30 through a distribution circuit such as a public switched telephone network (PSTN) for example, to other systems or receives the image data from other systems via the network. Central processing unit 10 has a memory such as a read only memory (ROM) in which a program is internally stored. The program internally stored in central processing unit 10 is programmed according to the process illustrated in FIGS. 2A and 2B. Programming the control procedure represented by FIGS. 2A and 2B is generally known in the art and the contents of a sentence can be simplified if C language is used.

FIG. 3A to 3D illustrate one configuration of a memory structure suitable for use in one embodiment of the present invention. The memory structure illustrated in FIG. 3A to 3D is located, for example, in signal processor 30 shown in FIG. 1. FIG. 3A shows the four-line memory structure 102 of signal processor 30 for storing gradation data scanned and n-bit data quantized from document scanner 20 of FIG. 1. FIGS. 3B and 3C show memory maps 104 and 106 of a buffer memory, in the buffer memory data read block by block from the information sequentially stored in the memory of FIG. 3A is sequentially stored. In the memory map shown in FIG. 3B, sixteen data values of a previous block are stored. In the memory map shown in FIG. 3C, sixteen data values of a current block are stored. FIG. 3D shows a buffer 108 for storing display data necessary for image processing. FIG. 3D has a plurality of assigned areas with D1 having a threshold value Tdiff of a reference brightness value; D2 for storing reference data Tsimil to determine whether or not the blocks are similar; D3 for storing the brightness difference Ldiff between pixels having maximum brightness and pixels having minimum brightness; D4 for storing the average brightness value Lavg for all the pixels in a block; D5 having an edge flag EDGEflag indicating whether or not an edge component is present; D6 for storing an average brightness value PREavg of a previous block; and D7 for storing a count value CNTsimil indicating the number of similar pixels between blocks.

Figure 4:
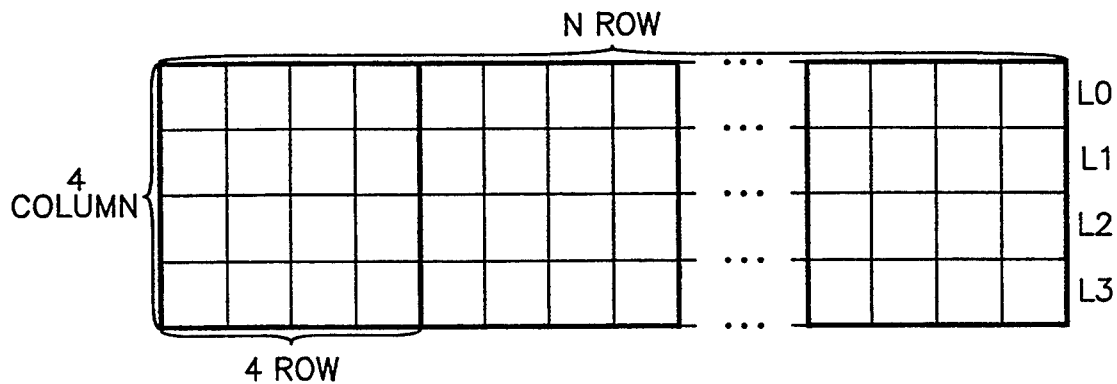
FIG. 4 is a diagram illustrating one form of a processing window configurations of one embodiment constructed according to the principles of the present invention.
Figures 5, 6:
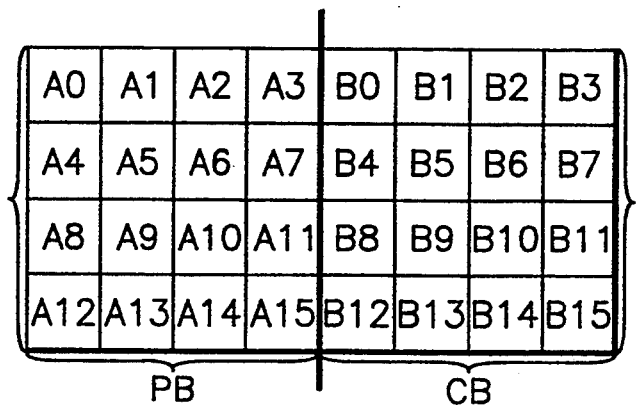
FIG. 5 is a diagram illustrating pixel arrangement between blocks when using the form of a processing window shown in FIG. 4.
FIG. 6 is a diagram illustrating one example of sign word assignment according to the principles of the present invention.
Figure 7:
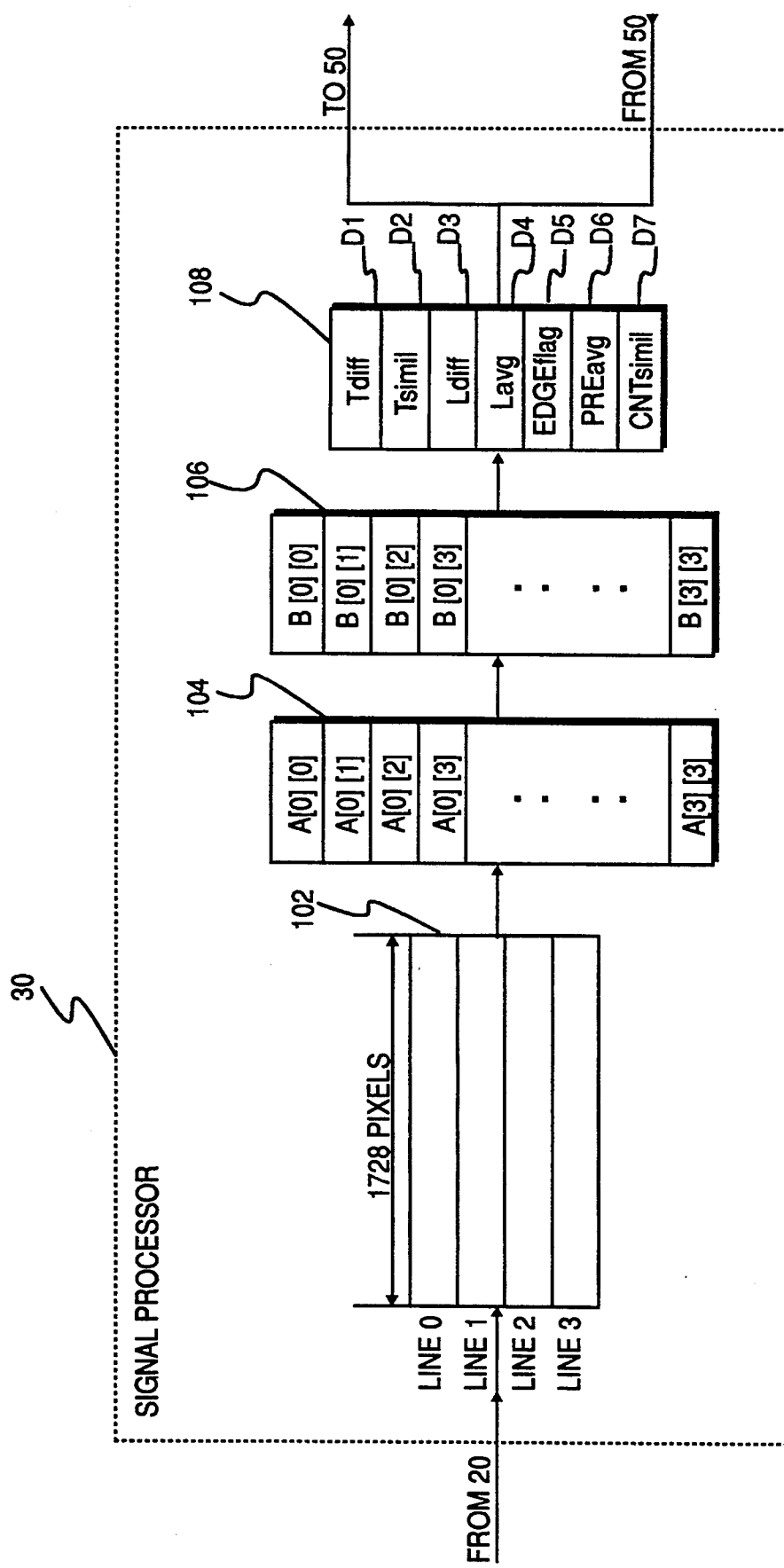
FIG. 7 is a diagram illustrating the memory structure configurations of FIGS. 3A to 3D in relation to the signal processor of the facsimile system depicted in FIG. 1.

FIG. 4 illustrates a processing window form for designating a processing window of four rows by four columns with respect to the pixels stored in the four-line memory of the signal processor 30, while FIG. 5 illustrates pixel arrangement between blocks of FIG. 4. A reference symbol PB designates pixels in a previous block and CB designates pixels in a current block. FIG. 6 provides one example of sign word assignment, the most frequently generated data has the simplest sign word. FIG. 7 illustrates the memory structure configuration of FIGS. 3A to 3D in relation to the signal processor 30.

The preferred embodiment of the present invention will now be described in detail with collective reference to FIGS. 1 to 7.

In FIG. 1, document scanner 20 scans documents under control of central processing unit 10 and converts an image signal into image data with a predetermined gradation, by sampling and n-bit quantization. If the document is borne by A4 paper size and the document scanner samples at two-hundred dpi (dots per inch), the number of pixels in one line is 1728. The output of document scanner 20 is fed to and stored in signal processor 30. Central processing unit 10 binarizes and encodes the gradation image data stored in signal processor 30 and transmits the encoded gradation image data through transmitter 50 to the PSTN. Moreover, a signal received by transmitter 50 from the PSTN is decoded and reproduced by signal processor 30 and recorded on recording paper by recorder 40.

Referring now to FIG. 2A at step 200, central processing unit 10 controls document scanner 20 to scan the first four lines of a document and store the digital image data of a predetermined gradation in, for example, a four-line memory of signal processor 30 shown in FIG. 3A. If the image data is quantized to four bits and stored in pixels of sixteen gradations, the amount of data stored in the four-line memory is 27,648 bits (=1728 pixels ×4 lines ×4 bits) when the number of pixels in one line is 1728. To scan four lines and store the data in the four-line memory is one example, other modifications are possible. Therefore, in the preferred embodiment, an example of four-bit quantization is explained and it is assumed that a dither matrix of four rows x four columns, which is capable of expressing sixteen gradations, is used. At step 202, the buffer memory for storing the binarized result for a previous block is initialized and an average value of the previous block is set at fifteen. Moreover the edge flag is reset and the window is designated to process the pixel data stored in the line memory by the block. Only initially is the average value of the previous block is set to fifteen; since there is no previous block initially, the average value of the previous block is actually set after determining the first block.

At step 204, the pixel data in a window (for example, one block arranged with sixteen pixels is generated with the designation of a window) is binarized and the binarization data is stored in the buffer memory represented by FIG. 3C. Then, the binarization data having the maximum brightness value and having a minimum brightness value is searched to calculate the brightness difference, and an average brightness value for the entire current block is calculated. The brightness difference, Ldiff, is calculated from the following expression (1):

Ldiff = maximum brightness value − minimum brightness value     (1)

The average brightness value Lavg of each pixel in the processing window is determined by the following expression (2) and stored in the area D4 of FIG. 3D:

Lavg = the sum total of a brightness value of each pixel /16     (2)

In order to improve the operational efficiency, the average brightness value may be determined by dividing the sum of the maximum brightness value and the minimum brightness value of pixels in the processing window by two, or may alternatively be taken as the median value between the maximum and minimum brightness values. Hence, the average brightness value is usually expressed to four bits. At step 206, the brightness difference is compared with the reference brightness difference. If the brightness difference Ldiff is greater than the reference brightness difference, step 206 goes to step 208 to check whether or not there is any similarity between previous and current blocks generated by the window. If the brightness difference Ldiff is less than the reference brightness difference, step 206 proceeds to step 214. Step 206 is achieved by comparing Tdiff in storage space D1 with Ldiff in storage space D3 shown in FIG. 3D, and step 208 is carried out by comparing Tsimil in storage space D2 with CNTsimil in storage space D7. For example, if a reference value for the similarity is twelve and a count value s of the similarity (in this case, the count value is incremented by one when the pixels of the previous and current blocks are the same) is greater than twelve, there is similarity. Otherwise, there is no similarity. In the preferred embodiment, since the number of pixels in one block is sixteen, the reference value should be less than sixteen. If there is similarity between the blocks, step 208 advances to step 210 to determine whether the current block is a similar block, and encodes the current block in a first encoding format. If there is no similarity, the current block is judged to be an edge block and encoded in a second encoding format at step 212. Subsequently, at step 212, the edge flag is set to 1. At step 214, the difference of average brightness values between the current and previous blocks is calculated.

Turning now to FIG. 2B, step 216 follows step 214. Step 216 checks to see if the edge flag has been set in order to determine whether or not the previous block is an edge. If the edge flag has been set, step 216 proceeds to step 218 to encode the current block in a fourth encoding format. If the edge flag is not set, step 216 advances to step 220 to determine if there is similarity between blocks. If there is similarity, step 220 proceeds to step 222 to judge the current block to be a similar block and encodes the current block in the first encoding format. If there is no similarity, step 220 goes to step 224 to judge the current block to be a flat block and encodes the current block in a third encoding format. At step 226, the edge flag is reset in order to encode the next block. At step 228, it is determined whether or not all of the pixels stored in memory are encoded. If all of the pixels in the memory are not encoded, step 228 proceeds to step 234. If all the pixels stored in memory are encoded, step 228 is followed by s step 230 to determine whether the scanning for all the lines of the document has been completed; if scanning for all of the lines has been completed, the entire series of the above steps is terminated. If however, all of the lines of the document have not been scanned, step 230 goes to step 232 to scan the next line pixel by pixel and store the pixel by pixel representation of the next line in the memory. Step 232 is followed by step 202. At step 234, the next processing window is designated. At step 236, the average value of the current block is set to the average value of the previous block. After step 236, the process returns to step 204.

The first encoding format is applied to an ideal similar block and a prefix "0" is transmitted. The second encoding format is applied to a block including an edge, and a prefix "11", and half tone data of sixteen bits is transmitted. The third encoding format is applied to a flat previous block and a flat current block and a prefix "10", and a corresponding code word shown in FIG. 6 for the difference of the average brightness values between two adjacent blocks are transmitted. The fourth encoding format is applied to an edge previous block and flat current block, and a prefix "10" and the average brightness value of the current block are transmitted.

The foregoing technique effectively encodes data on the basis that adjacent pixels of a gradation image such as a picture, painting, or some other printed image, have the same brightness level and that the human eye is sensitive to an edge in which the brightness variation is abruptly varied. The encoding process uses an appropriate encoding format after deciding whether the block to be encoded is an edge block, a block similar to an adjacent block, or a flat block.

As described above, degradation of picture quality is prevented and an eight times compression effect can be readily obtained as compared to the conventional process.

While the preferred embodiment of the invention has been particularly shown and described, it will be understood by those skilled in the art that foregoing and other changes in form and details may be made without departing from the spirit and scope of the present invention. For example, the table of the sign word may be expanded or varied.

It is apparent from the foregoing detailed description that the instant invention provides a device and method enabling encoding of image data for subsequent use, such as in transmission via a facsimile machine and subsequent document or image recreation, alteration or processing. The image borne on a medium such as a document, or alternatively, read from a memory such as a floppy disk, is encoded before transmission in order to reduce the amount of data required to represent the image. The reduction of data allows the image to be more efficiently transmitted, at lower cost and with greater reliability, than if the image was to be transmitted directly without encoding.

In one of the embodiments described in the foregoing paragraphs, the image is scanned in four-line portions. The scanner reduces the first four lines of an image to data on a pixel-by-pixel basis; each pixel in the first four lines is quantized into four-bit portions and stored in a memory as image data. A portion, such as a block, of the image data stored in the memory is then taken from the memory, binarized and stored in a transient memory such as a current block buffer memory. A block of data may be formed with one pixel, quantized to four bits, taken from the same portion of each line of the memory that corresponds to the first four lines of the image.

The block of data is then operated upon to determine whether the block of data represents a similar block, an edge block or a flat block. After operation upon the data establishes the representation by the block, the block of data is encoded according to its representation as either a similar block, edge or flat block. The block of data is then stored in another transient memory such as a previous block buffer memory. A new block of data is then taken from the memory storing the initially scanned data, binarized and placed into the current block buffer memory. The same operation is repeated to determine the representation of that block, and that block is then encoded. Scanning, quantizing, binarizing and encoding on the basis of representation of either a similar block, edge block or flat block, is repeated until the full image has been encoded.

What is claimed is:

1. A process for encoding a half tone image of an image transmission system, comprising the steps of:

storing image data obtained by scanning a plurality of lines of a document pixel by pixel in a memory area corresponding to the scanned plurality of lines, initializing a first buffer memory for storing a binarized result for a block of pixels of a predetermined block size, setting an average brightness value of a previous block to a predetermined average brightness value and storing said average brightness value of a previous block in a previous block average value buffer, and placing an edge flag in a reset state;

designating a window having said predetermined block size in order to process the image data stored in said memory area, binarizing said image data in the designated window, and storing the binarized data in said first buffer memory as said binarized result for a block of pixels;

detecting, from said binarized result, binarized data having a maximum brightness value and binarized data having a minimum brightness value;

calculating a brightness difference value indicating a difference between said maximum brightness value and said minimum brightness value in said first buffer memory and calculating an average brightness value indicating an average brightness of said block of pixels;

comparing said brightness difference value with a predetermined reference brightness difference value;

calculating a difference between said average brightness value calculated in said calculating step and the average brightness value of said previous block stored in said average value buffer when said brightness difference value is less than said predetermined reference brightness difference value, and then determining whether said edge flag is in said reset state or a set state;

determining whether there is similarity between a current block stored in said first buffer memory and a previous block stored in said second buffer memory when said brightness difference value is less than said predetermined reference brightness difference value and said edge flag is in said reset state, or when said brightness difference value is greater than said predetermined reference brightness difference value; and encoding said current block, said encoding step comprising one of the steps of:

encoding said current block to a first encoding format in order to raise data compression when said brightness difference value is greater than said predetermined reference brightness difference value and there is similarity between said blocks;

placing said edge flag in said set state and encoding said current block to a second encoding format in order to preserving an edge part when said brightness difference value is greater than said predetermined reference brightness difference value and there is no similarity between said blocks;

encoding said current block to a third encoding format when said brightness difference value is less than said predetermined reference brightness difference value, said edge flag is in said reset state and there is no similarity between said blocks;

encoding said current block to a fourth encoding format when said brightness difference value is less than said predetermined reference brightness difference value, said edge flag is in said set state; and encoding said current block to said first encoding format when said brightness difference value is less than said predetermined reference brightness difference value, said edge flag is in said reset state and there is similarity between said blocks.

2. The process as claimed in claim 1, further comprising the step of transmitting a prefix "0" and said current block having said first encoding format.

3. The process as claimed in claim 1, further comprising the step of transmitting a prefix "11", said current block having said second encoding format and half tone data of 16 bits.

4. The process as claimed in claim 1, further comprising the step of transmitting a prefix "10", said current block having said third encoding format and a code word indicative of a difference of average brightness values between two adjacent blocks.

5. The process as claimed in claim 1, further comprising the step of transmitting a prefix "10", said current block having said fourth encoding format and an average brightness value of said current block.

6. A method of encoding a gradation image from a document formed of a plurality of lines, in an image transmission system having a signal processor having a memory, a previous buffer memory for storing a previous block of data, a current buffer memory for storing a current block of data and a buffer for storing display data comprising a threshold value of a reference brightness difference value, reference similarity value, average brightness value for said previous block of data, average brightness value for said current block of data, an edge flag having one of a set and reset state, and a count value indicating the number of similar pixels between a current block and a previous block, comprising:

scanning a first plurality of lines of said document made up of a plurality of lines as image signals;

converting said image signals to image data, said image data being a binary representation, in pixels, of said image signals;

storing said image data in said memory;

initializing said previous buffer memory;

setting an initial value of said average brightness value for said previous block;

placing said edge flag in said reset state;

designating a window having a predetermined block size in order to process the image data stored in said memory binarizing said image data in said window to produce binarized image data;

storing said binarized image data in said current buffer memory as said current block of data;

detecting, from said binarized image data, a pixel having a maximum brightness value and a pixel having a minimum brightness value;

determining a brightness difference value between said pixel of said binarized image data having said maximum brightness value and said pixel of said binarized image data having said minimum brightness value;

determining an average brightness value of said binarized image data in said current buffer memory;

comparing said brightness difference value with said reference brightness difference value;

comparing corresponding pixels in the current block and previous block and counting the number of similar pixels to generate said count value;

comparing said reference similarity value with said count value indicating the number of similar pixels between blocks to determine whether said previous block and said current block are similar, when said brightness difference value is greater than said reference brightness difference value;

encoding said current block as a similar block in a first encoding format, when said current block and said previous block are determined to be similar;

encoding said current block as an edge block in a second encoding format and placing said edge flag in said set state, when said brightness difference value is greater than said reference brightness difference value and said previous block and said current block are not similar;

calculating a difference of average brightness value between said current block and said previous block, when said brightness difference is less than said reference brightness difference;

determining whether said edge flag is in said set state, wherein said set state indicates that the previous block was determined to be an edge block;

encoding said current block as a block following an edge block in a fourth encoding format, when it is determined that said edge flag is in said set state;

determining whether there is a similarity between said current block and said previous block, when it is determined that said edge flag is not in said set state;

encoding said current block as a similar block in said first encoding format, when said brightness difference value is less than said reference brightness difference value, said edge flag is not in said set state and there is similarity between said current block and said previous block;

encoding said current block as a flat block in a third encoding format, when it is determined that said edge flag is not in said set state and there is no similarity between said current block and said previous block;

placing said edge flag in said reset state;

determining whether all said pixels stored in said memory are encoded;

designating a next window having said predetermined block size, and storing said average brightness value for said current block in said buffer as said average brightness value of said previous block and returning to said step of binarizing, when it is determined that not all the pixels stored in said memory are encoded;

determining whether all of said lines of said document have been scanned, when it is determined that all said pixels stored in said memory are encoded; and scanning a next line of said document made up of a plurality of lines and storing said next line as image data in said memory and returning to said step of initializing, when it has been determined that all said lines of said document have not been scanned;

7. The method of claim 6, wherein the step of scanning a first plurality of lines of said document made up of a plurality of lines as image signals, comprises scanning four adjacent lines of said document.

8. The method of claim 7, wherein the step of designating a window comprises designating four adjacent pixels in each of four adjacent lines as said predetermined block size.

9. The method of claim 6, further comprising transmitting the encoded current block preceded by one of a prefix "0" when said current block is encoded in said first encoding format, a prefix "11" when said current block is encoded in said second encoding format, a prefix "10" when said current block is encoded in said third encoding format and a prefix "10" when said current block is encoded in said fourth encoding format.

10. The method of claim 9, wherein said transmitting step comprises transmitting prefix and said encoded current block through a public switched telephone network.

11. A method of encoding image data, said image data being a binary representation, in pixels, of a document made up of a plurality of lines, in an image transmission system having a signal processor having a memory, a previous buffer memory for storing a previous block of data, a current buffer memory for storing a current block of data and a buffer for storing display data comprising a threshold value of a reference brightness difference value, reference similarity value, average brightness value for said previous block of data, average brightness value for said current block of data, an edge flag having a set or a reset state, and a count value indicating the number of similar pixels between a current block and a previous block, comprising:

storing said image data in said memory;

setting an initial value of said average brightness value for said previous block;

placing said edge flag in said reset state;

binarizing said image data to produce binarized image data;

storing said binarized image data in said current buffer memory as said current block of data;

detecting, from said binarized image data, a pixel having a maximum brightness value and a pixel having a minimum brightness value;

determining a brightness difference value between said pixel of said binarized image data having said maximum brightness value and said pixel of said binarized image data having said minimum brightness value;

determining an average brightness value of said binarized image data in said current buffer memory;

comparing said brightness difference value with said reference brightness difference value;

generating a count value by comparing corresponding pixels in the current block and previous block and counting the number of similar pixels;

comparing said reference similarity value with said count value indicating the number of similar pixels between blocks to determine whether said previous block and said current block are similar, when said brightness difference value is greater than said reference brightness difference value;

encoding said current block as a similar block in a first encoding format, when said current block and said previous block are determined to be similar;

encoding said current block as an edge block in a second encoding format and placing said edge flag in said set state, when said brightness difference value is greater than said reference brightness difference value and said previous block and current block are not similar;

calculating a difference of average brightness value between said current block and said previous block, when said brightness difference is less than said reference brightness difference;

determining whether said edge flag is in said set state, wherein said set state indicates that the previous block was determined to be an edge block;

encoding said current block as a block following an edge block in a fourth encoding format, when it is determined that said edge flag is in said set state;

determining whether there is a similarity between said current block and said previous block, when it is determined that said edge flag is not in said set state;

encoding said current block as a similar block in said first encoding format, when said brightness difference value is less than said reference brightness difference value, said edge flag is not in said set state and there is similarity between said current block and said previous block;

encoding said current block as a flat block in a third encoding format, when it is determined that said edge flag is not in said set state and there is no similarity between said current block and said previous block;

placing said edge flag in said reset state;

determining whether all of said image data stored in said memory has been encoded;

determining whether all said lines of said document have been scanned, when it has been determined that all of said image data stored in said memory has been encoded;

scanning a next line of said document and storing said next line as image data in said memory returning to said step of setting an initial value, when it is determined that all said lines of said document have not been scanned.

12. The method of claim 11, wherein the step of storing said binarized image data in said current buffer memory as said current block of data, comprises storing a portion of said binarized image data in said current buffer memory as said current block of data.

13. The method of claim 11, further comprising transmitting the encoded current block preceded by one of a prefix "0" when said current block is encoded in said first encoding format, a prefix "11" when said current block is encoded in said second encoding format, a prefix "10" when said current block is encoded in said third encoding format and a prefix "10" when said current block is encoded in said fourth encoding format.

14. The method of claim 11, further comprising the step of transmitting the encoded current block through a public switched telephone network.

* * * * *